United States Patent
Parker (10) Patent No.: US 9,139,286 B2
(45) Date of Patent: Sep. 22, 2015

(54) HINGE ASSEMBLY FOR ROTATABLY MOUNTING A CONTROL SURFACE ON AN AIRCRAFT

(71) Applicant: Airbus Operations Limited, Bristol (GB)

(72) Inventor: Simon John Parker, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 196 days.

(21) Appl. No.: 13/907,392

(22) Filed: May 31, 2013

(65) Prior Publication Data
US 2013/0320152 A1 Dec. 5, 2013

(30) Foreign Application Priority Data
May 31, 2012 (GB) ................................. 1209666.5

(51) Int. Cl.
*B64C 9/02* (2006.01)
*B64C 9/34* (2006.01)
*B64C 9/00* (2006.01)

(52) U.S. Cl.
CPC ... *B64C 9/02* (2013.01); *B64C 9/34* (2013.01); *B64C 2009/005* (2013.01)

(58) Field of Classification Search
CPC ...... B64C 9/02; B64C 2009/005; B64C 9/34; B64C 9/08; B64C 9/06; B64C 9/32; B64C 9/04; B64C 13/00; B64C 3/50; B64C 3/58
USPC .................................... 244/90 A, 17.23, 90 R
See application file for complete search history.

(56) References Cited

U.S. PATENT DOCUMENTS

| | | | |
|---|---|---|---|
| 2,136,845 A * | 11/1938 | Fenton | 244/90 R |
| 4,717,097 A * | 1/1988 | Sepstrup | 244/217 |
| 4,738,415 A | 4/1988 | Weyer | |
| 7,665,690 B2 * | 2/2010 | Sheahan et al. | 244/49 |

FOREIGN PATENT DOCUMENTS

| | | |
|---|---|---|
| GB | 734446 | 8/1955 |
| GB | 1398002 | 6/1975 |
| GB | 2299562 | 10/1996 |
| WO | 2010142771 | 12/2010 |

OTHER PUBLICATIONS

UK Search Report for 1209666.5 mailed Sep. 13, 2012.

* cited by examiner

*Primary Examiner* — Tien Dinh
*Assistant Examiner* — Vicente Rodriguez
(74) *Attorney, Agent, or Firm* — Lowe Hauptman & Ham, LLP (57) ABSTRACT

A hinge assembly for rotatably mounting a control surface on an aircraft comprising an actuating shaft, a support element configured to mount the actuating shaft to a first component of an aircraft and a hinge element configured to mount the actuating shaft to a second component of an aircraft, wherein the actuating shaft is slidably mounted to the support element and configured to slide along its longitudinal axis relative to the support element, and the hinge element engages with the actuating shaft so that the actuating shaft and the hinge element are urged to rotate relative to each other about the longitudinal axis of the actuating shaft when the actuating shaft is urged to slide along its longitudinal axis, such that one of said first and second components is urged to rotate relative to the other said component about the longitudinal axis.

18 Claims, 7 Drawing Sheets

HINGE ASSEMBLY FOR ROTATABLY MOUNTING A CONTROL SURFACE ON AN AIRCRAFT

RELATED APPLICATIONS

The present application is based on, and claims priority from, Great Britain Application Number 1209666.5, filed May 31, 2012, the disclosure of which is hereby incorporated by reference herein in its entirety.

INTRODUCTION

The present invention relates to a hinge assembly for rotatably mounting a control surface on an aircraft. The present invention also relates to a wing assembly including a hinge assembly for rotatably mounting a control surface, and an aileron assembly including a hinge assembly for rotatably mounting a control surface mounted thereto.

BACKGROUND

Aircraft need to vary the amount of lift that different sections of their airframe, in particular their wings, produce for take-off, landing and manoeuvring during flight. Generally a number of control surfaces are used to control the flow of air over the airframe of an aircraft. Control surfaces used on an aircraft include slats, ailerons, flaps, and spoilers. For example, flaps are generally deployed symmetrically to control the stalling speed of an aircraft and ailerons are deployed to control the roll of the aircraft by operating asymmetrically, i.e. an aileron on one wing goes down as an aileron on the other wing goes up, such that the aircraft is caused to roll due to an increased lift produced by one wing and decreased lift generated by the other wing. An aircraft generally has additional control surfaces to further control the attitude of the aircraft, such as a rudder mounted to a vertical tail structure which operates to control the yaw of the aircraft, and elevators mounted to horizontal tail structures which operate to control the pitch of the aircraft.

Aircraft control surfaces are generally hingedly mounted to an airframe of an aircraft, for example to one of the wings or tail structures, so that they can pivot relative to the wing or tail structure and change the airflow over the wing or tail structure. A hinge assembly is used to mount the control surface and to rotate the control surface across a range of motion. Such a hinge assembly is able to maintain the control surface in a range of positions relative to the airframe of the aircraft so that positioning of the control surface can be accurately controlled.

A conventional hinge assembly for hingedly mounting a control surface to an airframe of an aircraft comprises a first pivot point defining a longitudinal axis about which the control surface pivots, and a second pivot point which is offset from the hinge point. A hydraulic piston is generally mounted to the second pivot point and extends between the second pivot point and the wing or tail structure so that, when the piston is actuated, the control surface is urged to rotate about the first pivot point due to the moment applied by the piston. Generally a hinge assembly will comprise a plurality of second pivot points and pistons spaced along the length of the control surface so that a uniform movement of the control surface is obtained along its length.

However, a problem with a conventional hinge assembly is that the pistons require a large space to house them, and it is not possible to produce the control surface as a modular unit. Furthermore, such systems require a large number of pistons to operate and a complex hydraulic system.

As described above, ailerons mounted to the wings of an aircraft are deployed to control the roll of an aircraft. However, an issue with the use of conventional ailerons is that as a secondary effect to generating roll, they also generate adverse yaw. Adverse yaw occurs when one aileron is deflected upwards and the other aileron on the opposing wing is deflected downwards to cause the aircraft to roll in the direction of the aileron deflected upwards. However, the ailerons also cause the aircraft to yaw in the opposite direction to the roll, which is known as adverse yaw, and this is normally compensated for by use of the rudder.

However, another means of compensating for adverse yaw, and generally controlling the yaw of an aircraft, is by use of spoilerons. A spoileron is a control surface which upstands from a control surface, such as a wing or an aileron, to spoil the airflow over it and so change the lift generated by the wing. Therefore, a spoileron can be used to compensate for the adverse yaw generated by use of the ailerons, or used in conjunction with the ailerons to allow simultaneous yaw and roll control.

A double acting spoileron is known from U.S. Pat. No. 2,582,348, in which each aileron has opposing spoilerons which are hinged to extend from the upper and lower surfaces of the aileron. Each pair of opposing spoilerons act in conjunction with each other so that they simultaneously extend from or are retracted in the aileron. The spoilerons are rotated by cables which act around two interacting quadrants and which are actuated by a piston. However, problems with the spoileron hinge assembly shown in U.S. Pat. No. 2,582,348 include the achievable chord length of the control surface being reduced due to the required length of the actuating piston, the actuating piston being orientated in the line of flight and the complicated and unreliable arrangement of the cables acting around the two interacting quadrants.

The present invention seeks to provide a hinge assembly for rotatably mounting a control surface on an aircraft which overcomes or substantially alleviates the problems and disadvantages described above.

SUMMARY OF THE INVENTION

According to the present invention, there is provided a hinge assembly for rotatably mounting a control surface on an aircraft comprising an actuating shaft, a support member configured to mount the actuating shaft to a first component of an aircraft and a hinge member configured to mount the actuating shaft to a second component of an aircraft, wherein the actuating shaft is slidably mounted to the support member and configured to slide along its longitudinal axis relative to the support member, and the hinge member engages with the actuating shaft so that the actuating shaft and the hinge member are urged to rotate relative to each other about the longitudinal axis of the actuating shaft when the actuating shaft is urged to slide along its longitudinal axis, such that one of said first and second components is urged to rotate relative to the other said component about the longitudinal axis.

Preferably, the hinge assembly further comprising a drive section formed along a portion of the actuating shaft which slidably engages with the hinge element so that the actuating shaft and the hinge element are urged to rotate relative to each other about the longitudinal axis of the actuating shaft when the actuating shaft is urged to slide along its longitudinal axis.

The drive section may comprise a helical gear profile which engages with the hinge element such that, when the actuating shaft is urged along its longitudinal axis, the helical gear profile acts on the hinge element to urge the hinge element and the actuating shaft to rotate relative to each other.

The hinge element may further comprise an aperture formed through it which is configured to receive the helical drive profile, wherein the aperture has a helical gear surface which engages with and acts against the helical gear profile.

The hinge assembly may further comprise a plurality of hinge elements.

In one embodiment, the actuating shaft and support element are slidably engaged to prevent the actuating shaft from rotating relative to the support element about the longitudinal axis.

Advantageously, the actuating shaft further comprises a spline section configured to slide in and engage with the support element so that the actuating shaft is prevented from rotating relative to the support element about the longitudinal axis.

Conveniently, the spline section comprises linear teeth which extend parallel to the longitudinal axis of the actuating shaft.

Preferably, the support element further comprises an aperture formed through it with grooves conforming to the spline section in which the spline section is slidably received.

The hinge assembly may further comprise a plurality of support elements.

In one embodiment, the hinge assembly further comprises a guide means which is configured to prevent the hinge element from sliding in a direction along the longitudinal axis of the actuating shaft when the actuating shaft is urged along said longitudinal axis.

Advantageously, the guide means is a guide element against which the hinge element abuts when the actuating shaft is urged along its longitudinal axis.

Conveniently, the guide element comprises two guide arms which extend either side of the hinge element.

The hinge assembly may further comprise a linear actuator to urge the actuating shaft along its longitudinal axis.

Advantageously, the linear actuator is configured to urge the actuating shaft along its longitudinal axis in opposing directions.

Preferably, the linear actuator is mountable to the first component.

According to another aspect of the invention, there is provided an aileron assembly comprising an aileron body, a first spoileron configured to extend from a first surface of the aileron body, a second spoileron configured to extend from a second surface of the aileron body, and a hinge assembly configured to move the first and second spoilerons between a retracted position, in which the first and second spoilerons are disposed in the aileron body, and a deployed position, in which the first and second spoilerons extend from the aileron body, the hinge assembly comprising a support element on the aileron body, a first hinge element on the first spoileron, a second hinge element on the second spoileron and an actuating shaft slidably mounted to the support element and configured to slide along its longitudinal axis relative to the support element, wherein the first hinge element is engaged with the actuating shaft so that the first hinge element is urged to rotate about the actuating shaft in one direction when the actuating shaft is urged to slide along its longitudinal axis, and the second hinge element is engaged with the actuating shaft so that the second hinge element is urged to rotate about the actuating shaft in an opposing direction to the first hinge element when the actuating shaft is urged to slide along its longitudinal axis such that the first and second spoilerons are urged to rotate in opposing directions about said longitudinal axis Advantageously, the hinge assembly is configured to simultaneously move the first and second spoilerons between a retracted position and a deployed position.

Preferably, the actuating shaft comprises first and second drive sections having opposing helical gear profiles formed along the actuating shaft which engage with the first and second hinge elements respectively such that, when the actuating shaft is urged along its longitudinal axis, the helical gear profile of the first drive section acts on the first hinge element to urge the first hinge element to rotate about the actuating shaft in one direction, and the helical gear profile of the second drive section acts on the second hinge element to urge the second hinge element to rotate about the actuating shaft in an opposing direction.

According to another aspect of the invention, there is provided a wing assembly comprising a wing section, an aileron, and a hinge assembly for rotatably mounting the aileron to the wing section, the hinge assembly comprising a support element on the wing section, a hinge element on the aileron, and an actuating shaft slidably mounted to the support element and configured to slide along its longitudinal axis relative to the support element, wherein the hinge element is engaged with the actuating shaft so that the actuating shaft and the hinge element are urged to rotate relative to each other when the actuating shaft is urged to slide along its longitudinal axis, such that the aileron is urged to rotate relative to the wing section about said longitudinal axis.

According to another aspect of the invention, there is provided a wing assembly comprising a wing section, an aileron, and a hinge assembly for rotatably mounting the aileron to the wing section, the hinge assembly comprising a support element on the aileron, a hinge element on the wing section, and an actuating shaft slidably mounted to the support element and configured to slide along its longitudinal axis relative to the support element, wherein the hinge element is engaged with the actuating shaft so that the actuating shaft and the hinge element are urged to rotate relative to each other when the actuating shaft is urged to slide along its longitudinal axis, such that the aileron is urged to rotate relative to the wing section about said longitudinal axis.

DESCRIPTION OF THE DRAWINGS

Embodiments of the invention will now be described, by way of example only, and with reference to the accompanying drawings, in which.

DESCRIPTION OF THE PREFERRED EMBODIMENTS

Figure 1:
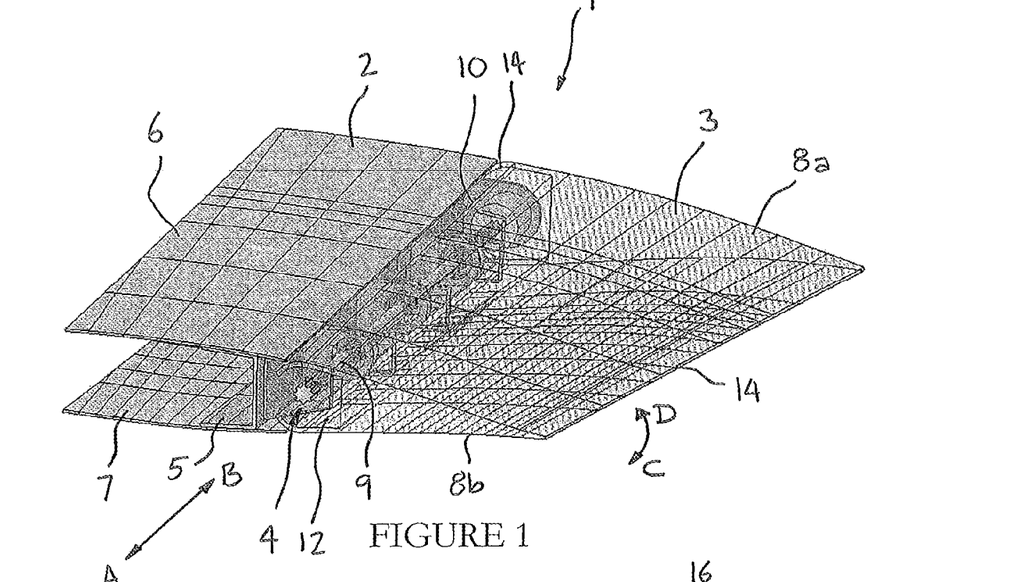
FIG. 1 is a perspective view of part of an aircraft wing with an aileron extending therefrom, and a hinge assembly for rotatably mounting a control surface on an aircraft mounting the aileron relative to the wing.

Referring to FIG. 1 of the accompanying drawings, there is shown part of a wing assembly 1 for an aircraft comprising a wing section 2, which forms part of an aircraft airframe, and an aileron 3. The wing assembly 1 has a leading edge (not shown) along the front of the wing, and a trailing edge along the rear of the wing. The aileron 3 is mounted to a trailing edge of the wing section 2 by a hinge assembly 4, and the aileron 3 is rotatable relative to the wing section 2 about a longitudinal hinge line extending parallel to the trailing edge of the wing 1.

The wing section 2 is formed from a wing box comprising a front longitudinal spar (not shown) and a rear longitudinal spar 5 which extends parallel to, but spaced from the front longitudinal spar. Lateral ribs (not shown) are connected between the front and rear spars and upper and lower covers 6,7 extend over the lateral ribs, between the front and rear spars. The front and rear longitudinal spars resist bending and twisting loads and the shearing loads are taken on by the upper and lower covers 6,7.

The aileron 2 comprises upper and lower faces 8a,8b which are spaced apart at a front end 10 so that they follow the line of the upper and lower covers 6,7 of the wing section 2 when the aileron 3 is mounted to the wing section 2. A hinge assembly receiving space 12 extends elongately along the front end 10 of the aileron 2 between the upper and lower faces 8a,8b of the aileron 2 and the hinge assembly 4 is received therein, as will be explained hereinafter. The upper and lower faces 8a,8b of the aileron 2 converge towards each other to a rear end 14 of the aileron 3.

The aileron 3 is pivotably mounted to the rear spar 5 of the wing section 2 by the hinge assembly 4 and is rotatable about a longitudinal axis forming the hinge line of the aileron which extends parallel to the rear spar 5. The hinge line is defined by the longitudinal axis of an actuating shaft 9 forming part of the hinge assembly 4.

The hinge assembly 4 will now be described in detail. Although the hinge assembly is used to pivotally mount an aileron to a wing section in these exemplary embodiments, it will be appreciated that use of the hinge assembly is not limited thereto and may be used to pivotably mount different aircraft control surfaces on an aircraft, and to pivotably mount other components to each other such that said components are pivotable relative to each other.

Figure 2:
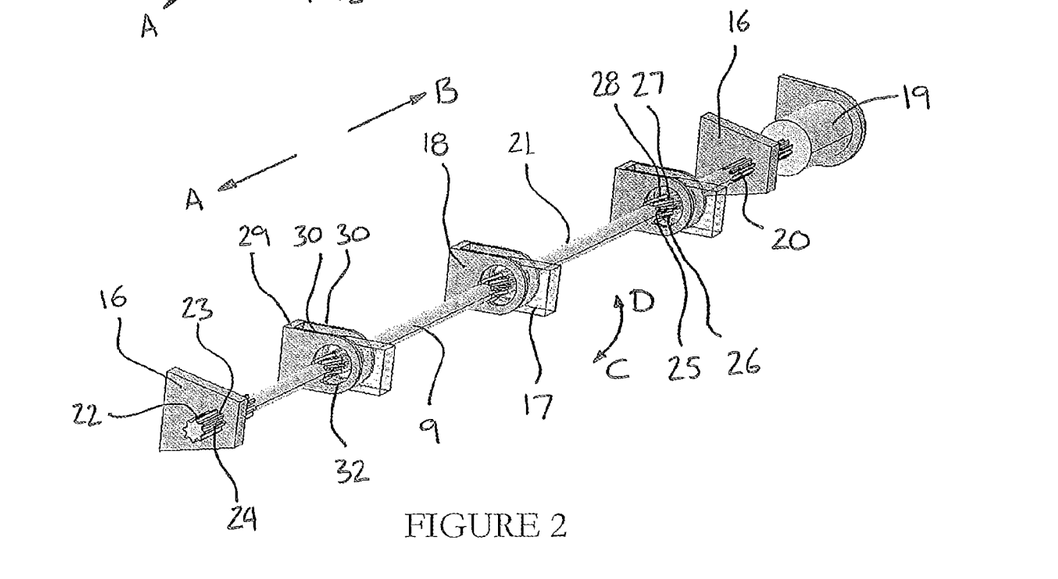
FIG. 2 is a perspective view of the hinge assembly shown in FIG. 1.

Referring now to FIG. 2, the hinge assembly 4 is shown. The hinge assembly 4 comprises the elongate actuating shaft 9, support members 16 which mount the shaft 9 to a first component, hinge members 17 which mount the shaft to a second component, guide members 18 which restrain the hinge members 17 from moving in a direction along the longitudinal axis of the actuating shaft 9 and a linear actuator 19 which urges the actuating shaft 9 to slide in a longitudinal direction along its longitudinal axis. In the present embodiment, the first component is the wing section 2 of the aircraft airframe and the second component is the aileron 3. However, it will be appreciated that in an alternative embodiment the first component is a different part of the aircraft airframe and the second component is a different control surface.

The elongate actuating shaft 9 is cylindrical and has first and second spline sections 20,22 at each end comprising linear teeth extending parallel to the axis of the shaft 9. The first spline section 20 at one end of the shaft 9 is recessed in the shaft 9 such that the major diameter of the teeth of the first spline section 20 corresponds to the diameter of an outer surface 21 of the shaft 9. The second spline section 22 at the other end of the shaft 9 protrudes from the outer surface 21 of the shaft 9 such that the major diameter of the teeth of the second spline section 22 is greater than the diameter of the outer surface 21 of the shaft 9. The length of each spline section 20,22 along the shaft 9 corresponds to a length greater or equal to the stroke of the linear actuator 19, as will become apparent hereinafter.

The two support members 16 fixedly mount to or extend from the first component when the hinge assembly 4 is assembled. Each support member 16 is a rib with a support aperture 23 formed therethrough through which a corresponding spline section 22 of the actuating shaft 9 is received. Each support aperture 23 has restraining grooves 24 formed around its circumference which engage with the teeth of the corresponding spline sections 20,22 to restrict rotation of the shaft 9 and support members 16 relative to each other. However, the shaft 9 is slidable in the support apertures 23 in its longitudinal direction, as will become apparent hereinafter. The two support members 16 are spaced apart from each other so that they align with the position of their corresponding spline sections 20,22 on the shaft 9.

Although in the present embodiment the spline sections 20,22 are shown at each end of the shaft 9, it will be appreciated that in an alternative embodiment the spline sections 20,22 may be spaced from the end of the shaft 9. Furthermore, although two support members 16 and corresponding spline sections 20,22 are shown, it will be appreciated that the number of support members and corresponding spline sections are dependent on the length of the shaft 9, and the torque applied to the shaft by the second component, the aileron 3.

Figure 3:
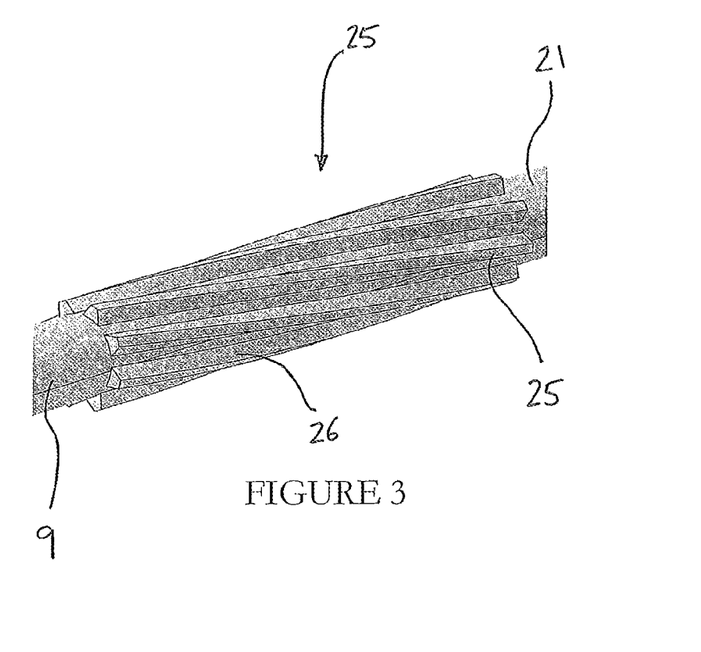
FIG. 3 is a perspective view of part of an actuating shaft of the hinge assembly shown in FIG. 2.

The actuating shaft 9 further comprises drive sections 25 spaced along it. Referring to FIG. 3, each drive section 25 is provided with a helical gear profile 26 extending along a portion of the shaft 9. The length of each drive section 25 along the shaft 9 corresponds to a length greater or equal to the stroke of the linear actuator 19, as will become apparent hereinafter. The drive sections 25 protrude from the outer surface 21 of the shaft 9.

The hinge members 17 fixedly mount to or extend from the second component when the hinge assembly 4 is assembled. Each hinge member 17 is a rib with a drive aperture 27 formed therethrough, through which a corresponding drive section 25 of the actuating shaft 9 is received. Each drive aperture 27 has an internal gear surface 28 formed on its internal circumference such that the internal gear teeth of each drive aperture 27 engage with the teeth of the corresponding drive section 25 and the drive sections 25 of the shaft 9 are slidable in the corresponding drive apertures 27 of the hinge member 17, to urge the hinge members to rotate, as will be explained hereinafter. The hinge members 17 are spaced apart from each other so that they align and engage with the position of their corresponding drive sections 25 on the shaft 9.

Although three drive sections 25 and corresponding hinge members 17 are shown in FIG. 2, it will be appreciated that the hinge assembly may comprise a single drive section 25, or a plurality of drive sections. Furthermore, two or more hinge members 17 may engage with a single drive section 25 of the actuating shaft 9.

The linear actuator 19 is fixedly mounted relative to the support members 16, such that the linear actuator 19 and the support members 16 are prevented from rotating relative to each other. The actuating shaft 9 is fixedly coupled to the linear actuator 19, which is a hydraulic piston or the like, such that the linear actuator 19 is able to urge the actuating shaft in a linear motion along a longitudinal axis of the actuating shaft in the direction of arrow 'A' or 'B' (see FIG. 2) and thereby drive the hinge members to rotate in the direction of arrow 'C' or 'D' depending on the desired rotation of the first and second components relative to each other.

Figure 4:
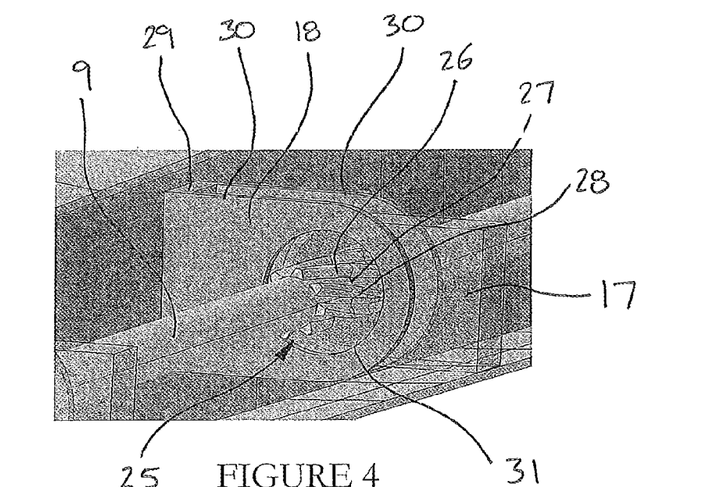
FIG. 4 is a perspective view of part of the hinge assembly shown in FIG. 2.
Figure 5:
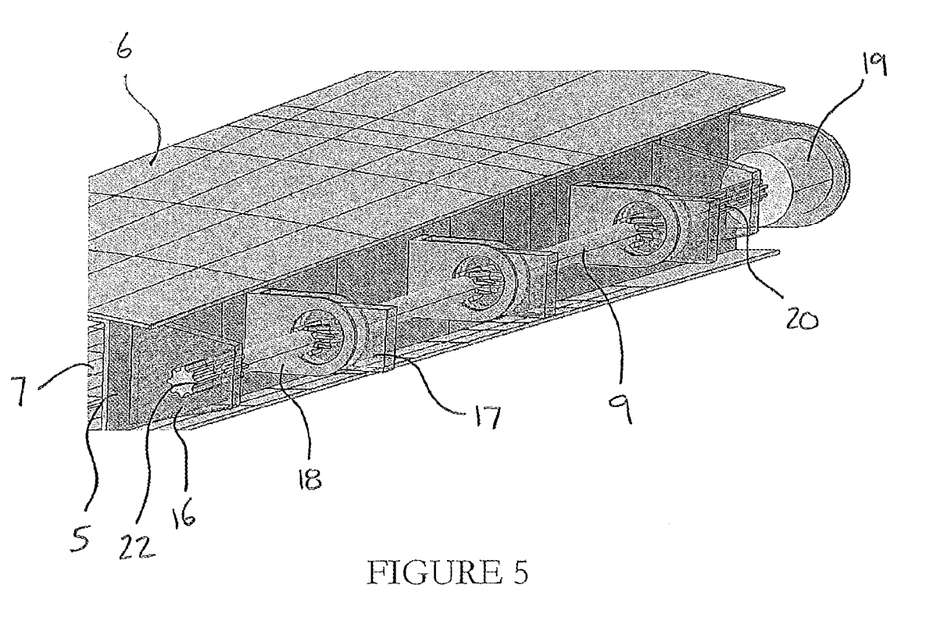
FIG. 5 is another perspective view of part of the hinge assembly shown in FIG. 2.

Referring to FIG. 4, the guide members 18 fixedly mount to or extend from the first component when the hinge assembly is assembled. The guide members 18 are U-shaped with a base 29 and two arms 30 extending from the base 29, spaced from each other (refer to FIG. 4). The base 29 is fixedly mounted to the first component, and the arms 30 upstand therefrom. A hole 32 is formed through each arm 30 through which the actuating shaft 9 is extendable, and the diameter of each hole 32 is greater than the diameter of the shaft 9 and the drive sections 25, such that they are spaced from the edge of each hole 32 when the shaft extends therethrough, as will be explained hereinafter.

The arms 30 of each guide member 18 are spaced to receive a hinge member 18 therebetween so that the hinge member is rotatable relative to the guide member, but is restrained from moving in a longitudinal direction along the axis of the shaft relative to the guide member 18.

Assembly of the hinge assembly will now be described with reference to FIGS. 2 to 5.

The support members 16, guide members 18 and linear actuator 19 are fixedly mounted to the first component, or form part of the first component, such that they extend therefrom. The support members 16, guide members 18 and linear actuator 19 are spaced from each other to correspond to the spacing of the spline sections 20,22, drive sections 25 and end of the actuating shaft 9 respectively so that they align therewith. Similarly, the hinge members 17 are fixedly mounted to the second component, or form part of the second component such that they extend therefrom, and are spaced from each other to correspond to the spacing of the guide members 18 extending from the first component.

The first and second components are then brought together such that the hinge members are disposed between the arms of the corresponding guide members and the centre of each support aperture and drive aperture align along a common longitudinal axis, which defines the hinge line.

The actuating shaft 9 is inserted and is slid through the support apertures 23 of the support members 16, the drive apertures 27 of the hinge members 17 and coupled to the linear actuator 19. The recessed spline 20 at the first end of the actuating shaft 9 has a smaller diameter than the protruding spline at the other end of the shaft and the drive sections and so is slidable through the second support apertures 23 and each of the drive apertures 27 without engaging therewith. When the actuating shaft 9 is inserted and fixedly coupled to the linear actuator 19, the support members 16 are aligned and engaged with their respective spline sections 20,22 of the shaft 9, such that the spline teeth slidably engage with the restraining grooves 24 of the support apertures 23. Similarly, the hinge members 17 are aligned with their respective drive sections 25 such that the helical gear profiles 26 engage with the corresponding helical internal gear surface 28 of the drive apertures 27 and the hinge members are disposed between the arms 30 of their respective guide members.

Although the guide members 18 described herein in respect to the exemplary embodiment comprise U-shaped sections which extend either side of each hinge member 17 to prevent each hinge member 17 from sliding relative to the guide members 18 and hence the second component sliding in a direction along the longitudinal axis of the shaft 9 relative to the first component, it will be appreciated that another means may be used to prevent the first and second components sliding relative to each other in a direction along the longitudinal axis of the actuating shaft. For example, a guide arm may extend on the outside of each support member, extending from the second component such that the guide arms and hinge members are fixedly mounted with respect to each other. An advantage of the guide members described above is that they resist bending of the hinge members due to the lateral force applied on them by the shaft being urged along its axis.

Operation of the hinge mechanism according to the present exemplary embodiment will now be described with reference to FIGS. 1 to 5. In the present embodiment, as described above, the first component is the wing section 2 of the aircraft airframe and the second component is the aileron 3.

Referring now to FIG. 1, the hinge assembly 4 mounts the aileron 3 to the rear spar 5 of the wing section 2 of the aircraft airframe. The aileron 3 is initially in a neutral position as shown in FIGS. 1, 2, 4 and 5 with the linear actuator 19 maintaining the shaft 9 at the midpoint of its stroke. Therefore, the support members 16 are disposed at the midpoint of their respective splines 20, 22 and each hinge member 17 is disposed at the midpoint of their respective drive sections 25.

The support members 16 and linear actuator 19 are fixedly mounted to the rear spar 5 of the wing section 2, and so the shaft 9 is prevented from rotating by the teeth of the spline sections 20, 22 engaging with the restraining grooves 24 of the support members 16. The hinge members 17 are fixedly mounted to the aileron 3, and so the aileron is prevented from rotating relative to the wing section 2 by the internal gear surface 28 of the drive apertures 27 formed through the hinge members 17 engaging with the gear teeth of the corresponding drive section 25. The shaft 9 is prevented from sliding along its longitudinal axis by the linear actuator 19.

In order to rotate the aileron 3 relative to the wing section 2 of the aircraft airframe, the linear actuator 19 is actuated. To rotate the aileron 3 in the direction of arrow 'C' (refer to FIG. 1), the linear actuator 19 is urges the shaft in a direction away from the linear actuator 19 in the direction of arrow 'A'. The shaft 9 then slides along its longitudinal axis such that the spline sections 20,22 slide in the support apertures 23 formed through the support members 16, but prevent the shaft from rotating about its axis. The helical gear profile 26 of each drive section 25 formed on the shaft 9 acts on the internal gear surface 28 of its corresponding hinge member 17. Each hinge member 17 is prevented from sliding along the longitudinal direction of the shaft 9 by one of the arms 30 of its respective guide member 18 which are fixedly mounted to the rear spar 5 of the wing section 2. The drive sections 25 of the shaft 9 therefore urge the hinge member 17 to rotate about the longitudinal axis of the shaft 9.

Therefore, as the shaft 9 moves along its longitudinal axis it imparts a rotational force on each hinge member 17 and so urges the aileron to rotate about the longitudinal axis of the shaft 9. The aileron 3 is then rotated into its desired position and the actuation of the linear actuator 19 is stopped. The linear actuator 19 then prevents the shaft from sliding along its linear actuator, and so the aileron 3 is prevented from rotating about its hinge line relative to the wing section 2.

To return the aileron to its neutral position, or to rotate the aileron beyond its neutral position in the opposite direction in the direction of arrow 'D' (refer to FIG. 1), the linear actuator urges the actuating shaft 9 in a direction towards the linear actuator 19 in the direction of arrow 'B'. The shaft 9 then slides along its longitudinal axis such that the spline sections 20,22 slide in the support apertures 23 formed through the support members 16, but prevent the shaft from rotating about its axis. The helical gear profile 26 of each drive section 25 acts on the internal gear surface 28 of its corresponding hinge member 17 and each hinge member 17 is prevented from sliding along the longitudinal direction of the shaft 9 by one of the arms 30 of its respective guide member 18. The drive sections 25 of the shaft 9 therefore urge the hinge member 17 to rotate about the longitudinal axis of the shaft 9 in the direction of arrow 'D'. The aileron 3 is then rotated into its desired position.

It will be appreciated that the range of deployment of the aileron is determined by stroke of the linear actuator 19 and/or the pitch of the helical gear profile 26 of each drive section 25 divided by the length of the drive section 25.

An alternative embodiment of a wing assembly will now be described with reference to FIGS. 6 and 7. The wing assembly having a hinge assembly 40 according to this present embodiment is generally the same as the wing assembly having a hinge assembly 4 described above, and so a detailed description will be omitted herein. Furthermore, components and features corresponding to components and features described in the foregoing embodiment will retain the same reference numerals. However, in this embodiment the first component is an aileron 43, and the second component is a wing section 42 of the aircraft airframe.

Figure 6:
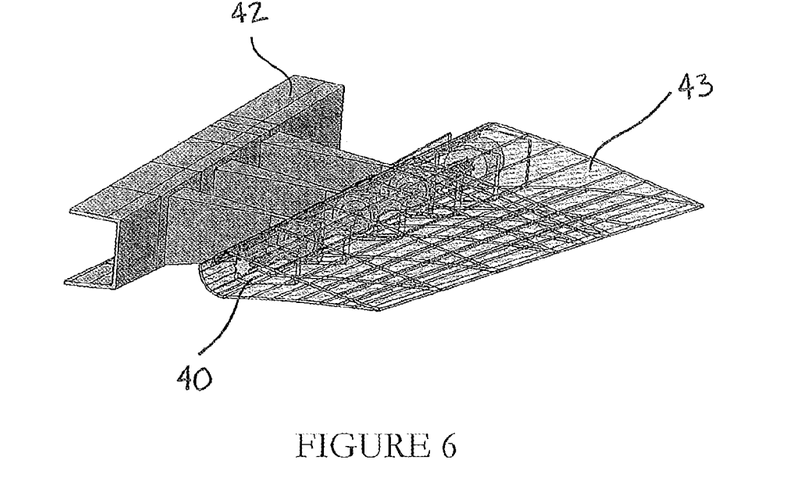
FIG. 6 is a perspective view of part of an aircraft wing with an aileron extending therefrom, and an alternative arrangement of a hinge assembly for rotatably mounting a control surface on an aircraft.
Figure 7:
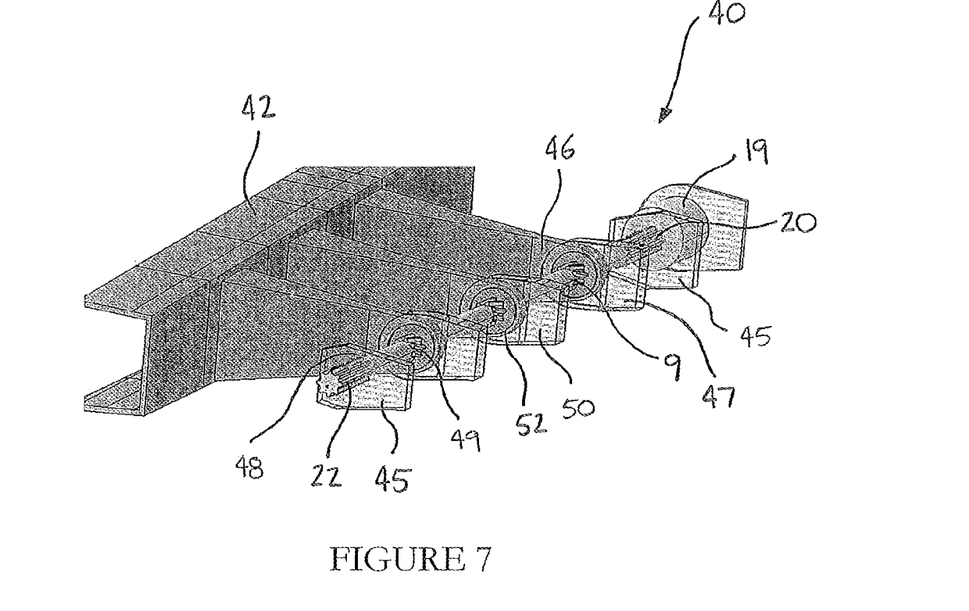
FIG. 7 is a perspective view of the hinge assembly shown in FIG. 6.

Referring now to FIGS. 6 and 7, the hinge assembly 40 according to the present embodiment is shown mounting the aileron 43 to the wing section 42 of the aircraft airframe. The hinge assembly 40 comprise the elongate actuating shaft 9, support members 45 which mount the shaft 9 to the aileron 43, hinge members 46 which mount the shaft 9 to the wing section 42, guide members 47 which restrain the hinge members 46 from sliding along the longitudinal axis of the actuating shaft 4 and a linear actuator 19 which urges the actuating shaft 9 to slide in a longitudinal direction along its axis. Although the hinge assembly described herein is used to pivotally mount an aileron to a wing section, it will be appreciated that use of the hinge assembly is not limited thereto, and that in an alternative embodiment the hinge assembly is used to pivotably mount different aircraft control surfaces on an aircraft.

In the present embodiment the aileron 40 and hinge assembly 4 are combined such that the aileron can be formed as a modular assembly, wherein the shaft, support members, guide members and linear actuator all rotate relative to the wing section 42 about the longitudinal axis of the shaft.

The elongate actuating shaft 9 has first and second spline sections 20,22 at each end. The length of each spline section 20,22 along the shaft 9 corresponds to a length greater or equal to the stroke of the linear actuator 19.

The support members 45 are disposed in the aileron 40 with a support aperture 48 formed therethrough in which a corresponding spline section 22 of the actuating shaft 9 is received. Each support aperture 48 has restraining grooves which engage with the teeth of the corresponding spline sections 20,22 to restrict rotation of the shaft 9 and support members 45 relative to each other, but to allow the shaft 9 to slide in its longitudinal direction. The support members 45 are spaced apart from each other so that they align with the position of their corresponding spline sections 20,22 on the shaft 9.

Although in the present embodiment the spline sections 20,22 are shown at each end of the shaft 9, it will be appreciated that in an alternative embodiment the spline sections 20,22 may be spaced from the end of the shaft 9. Furthermore, although two support members 45 and corresponding spline sections 20,22 are shown, it will be appreciated that the number of support members and corresponding spline sections are dependent on the length of the shaft 9, and the torque applied to the shaft by the aileron 3.

The actuating shaft 9 also has drive sections 25 spaced along it, each drive section 25 having a helical gear profile 26 extending along a portion of the shaft 9. Each hinge member 46 is a rib extending from the wing section 42 with a drive aperture 49 formed therethrough through which a corresponding drive section 25 of the actuating shaft 9 is received. Each drive aperture 27 has an internal gear surface 28 which engages with the teeth of the corresponding drive section 25, and the drive sections 25 of the shaft 9 are slidable in the corresponding drive apertures 49 to urge the hinge members to rotate.

The linear actuator 19 is fixedly mounted in the aileron 43, such that the linear actuator 19 and the support members 45 are prevented from rotating relative to each other. The actuating shaft 9 is fixedly coupled to the linear actuator 19, which is a hydraulic piston or the like, such that the linear actuator 19 urges the actuating shaft in a linear motion along a longitudinal axis of the actuating shaft.

The guide members 47 are disposed in the aileron 43 and each have a U-shaped arrangement with two upstanding arms 50 spaced from each other. A hole 52 is formed through each arm 50 through which the actuating shaft 9 is extendable without contacting the edge of each hole 52. The arms 50 are spaced to receive a hinge member 46 therebetween to restrain them from moving in a longitudinal direction along the axis of the shaft.

The support members 45, guide members 47 and linear actuator 19 are spaced from each other to align with the spacing of the spline sections 20,22, drive sections 25 and end of the actuating shaft 9 respectively. The hinge members 46 are disposed between the arms 50 of the corresponding guide members 47 and the actuating shaft 9 is disposed through the support apertures 48, drive apertures 49, holes 52 and coupled to the linear actuator 19. The spline teeth of the spline sections 20,22 engage with the restraining grooves of the support apertures 48 and the helical gear profiles 26 of the drive sections 25 engage with the corresponding helical internal gear surface 28 of the drive apertures 27.

Operation of the hinge mechanism according to the present exemplary embodiment will now be described with reference to FIGS. 6 and 7.

The hinge assembly 40 mounts the aileron 43 to the wing section 42 of the aircraft airframe. The aileron 43 is initially in a neutral position with the linear actuator 19 maintaining the shaft 9 at the midpoint of its stroke. Therefore, the support members 45 are disposed at the midpoint of their respective splines 20, 22 and each hinge member 46 is disposed at the midpoint of their respective drive sections 25.

The hinge members 46 are fixedly mounted to the wing section 42, and so the shaft 9 is prevented from rotating relative to the wing section 42 by the internal gear surface 28 of the drive apertures 27 engaging with the gear teeth of the corresponding drive section 25. The aileron 43 is prevented from rotating relative to the wing section 42 by the teeth of the spline sections 20, 22 engaging with the restraining grooves 24 of the support members 45. The shaft 9 is prevented from sliding along its longitudinal axis by the linear actuator 19.

The linear actuator 19 is actuated to rotate the aileron 43 relative to the wing section 42. To rotate the aileron 3, the linear actuator 19 urges the shaft 9 in a direction away from or towards the linear actuator. The shaft 9 then slides along its longitudinal axis with respect to the aileron 43 such that the spline sections 20,22 slide in the support apertures 48 formed through the support members 45, but prevent the shaft from rotating about its axis relative to the aileron 43. The helical gear profile 26 of each drive section 25 formed on the shaft 9 acts on the internal gear surface of its corresponding hinge member 46, but the aileron 43 and wing section 42 are prevented from sliding relative to each other along the longitudinal direction of the shaft 9 by the guide member arms 30 acting on the hinge members 46. The drive sections 25 of the shaft 9 slide in the drive apertures 49 of the hinge members 46 and imparts a rotational force on each hinge member 17 and so urges the shaft 9 to rotate in drive apertures 49 about the longitudinal axis of the shaft 9, and therefore the aileron 43 to rotate relative to the wing section 42.

The aileron 43 is then rotated into its desired position and the actuation of the linear actuator 19 is stopped. The linear actuator 19 then prevents the shaft from sliding along its linear actuator, and so the aileron 43 is prevented from rotating about its hinge line relative to the wing section 42.

To return the aileron to its neutral position, or to rotate the aileron 43 beyond its neutral position in the opposite direction, the linear actuator urges the actuating shaft 9 in a direction towards the linear actuator 19.

In the present embodiment the aileron 40 and hinge assembly 4 are combined such that the aileron can be formed as a modular assembly, wherein the shaft, support members, guide members and linear actuator all rotate relative to the wing section 42 about the longitudinal axis of the shaft.

The above embodiments provide a more compact arrangement compared to conventional hinge assemblies and wing assemblies, and allow the aileron to be activated along its hinge line rather than at an offset pivot point. Furthermore, the above described arrangements allow for a modular assembly which improves assembly time and improve aileron sealing.

An alternative embodiment of an aileron will now be described with reference to FIGS. 8 to 11. In this embodiment, the hinge assembly for rotatably mounting the aileron to a wing section is a conventional hinge assembly, and so a detailed description will not be given herein. However, it will be appreciated that in an alternative embodiment the hinge assembly mounting the aileron to a wing section is one of the embodiments of a hinge assembly described above with reference to FIGS. 1 to 7.

Figure 8:
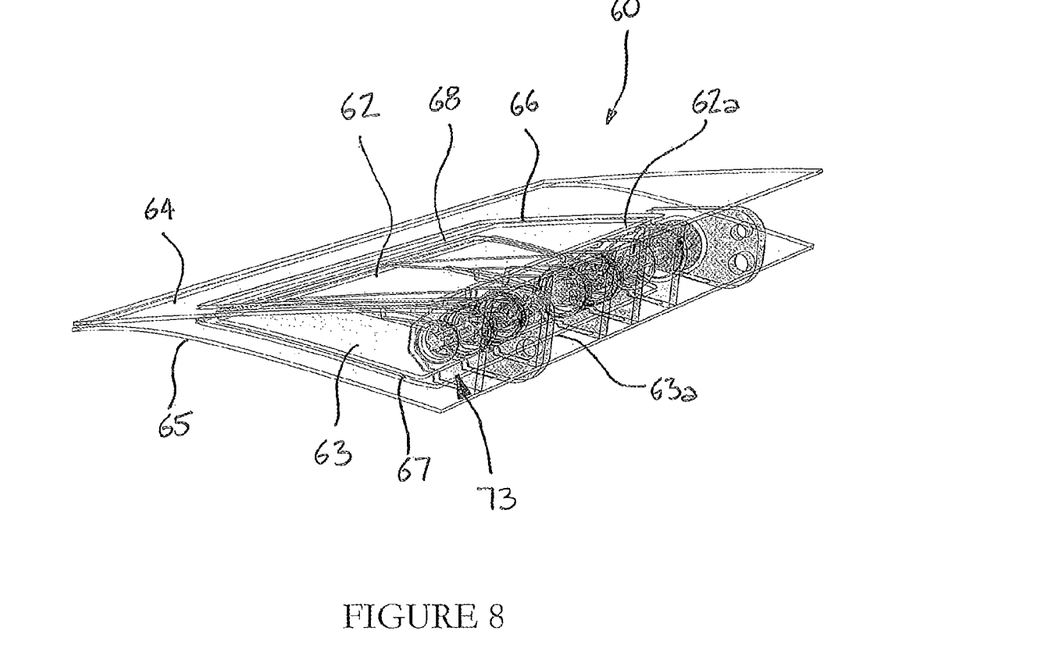
FIG. 8 is a perspective view of an aileron with a double acting spoileron mounted thereto and an alternative arrangement of a hinge assembly for rotatably mounting a control surface on an aircraft mounting the spoilerons to the aileron.
Figure 9:
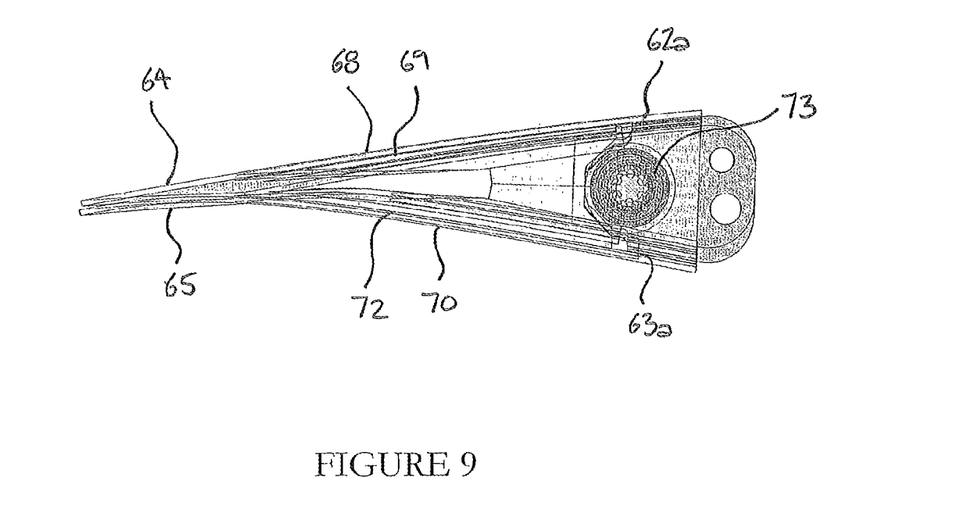
FIG. 9 is a side view of the aileron with two spoilerons mounted thereto as shown in FIG. 8.
Figure 9A:
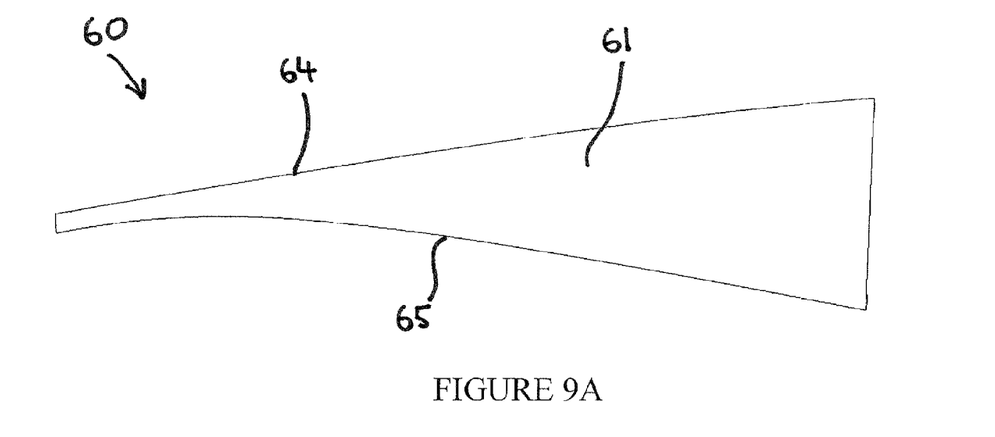
FIG. 9A is a schematic representation of an exemplary embodiment of the first and second spoilerons in a retracted position.
Figure 9B:
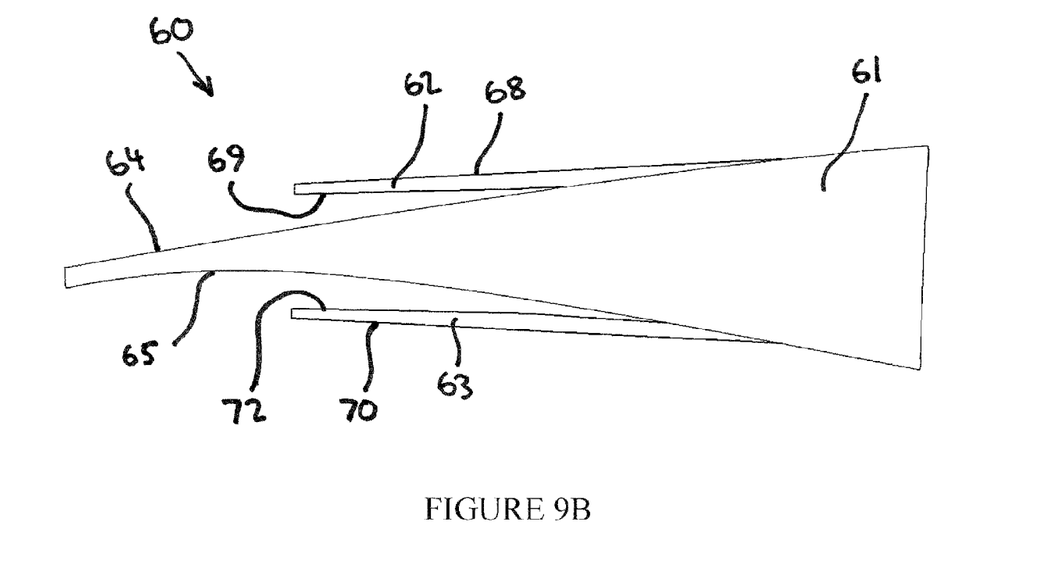
FIG. 9B is a schematic representation of an exemplary embodiment of the first and second spoilerons in a deployed position.

Referring now to FIGS. 8 and 9, an aileron 60 is shown with upper and lower spoilerons 62, 63 mounted thereto. The upper and lower spoilerons 62, 63 are control surfaces which rotate about a longitudinal axis located proximate to a leading edge 62a, 63a of each spoileron 62, 63 so that the upper and lower spoilerons 62, 63 extend into the airflow over the upper and lower surfaces 64, 65 of an aileron body 61 when deployed, as will be explained hereinafter, to spoil the airflow over the aileron and alter the lift generated by the wing.

Spoileron receiving recesses 66, 67 are formed in the upper and lower surfaces 64, 65 respectively of the aileron 60 in which the upper and lower spoilerons 62, 63 are received when they are not deployed. The upper spoileron 62 is a plate with outer and inner faces 68, 69. The outer face 68 of the upper spoileron 62 conforms to the upper surface 64 of the aileron body 61, so that it lies flush with the upper surface 64 when the upper spoileron 62 is received in the upper spoileron receiving recess 66. Similarly, the lower spoileron 63 is a plate with outer and inner faces 70, 72 and the outer face 70 of the lower spoileron 63 conforms to the lower surface 65 of the aileron body 61, so that it lies flush with the lower surface 65 when the lower spoileron 62 is received in the lower spoileron receiving recess 67.

Each spoileron 62,63 is rotatably mounted to the aileron 60 by a hinge assembly 73. The hinge assembly 73 is generally the same as the hinge assembly described above with reference to FIGS. 1 to 4, and so a detailed description will be omitted herein. Furthermore, components and features corresponding to components and features described in the foregoing embodiment will retain the same reference numerals. However, in this embodiment the hinge assembly 73 is arranged to rotatably mount two opposing spoileron to an aileron.

Figure 10:
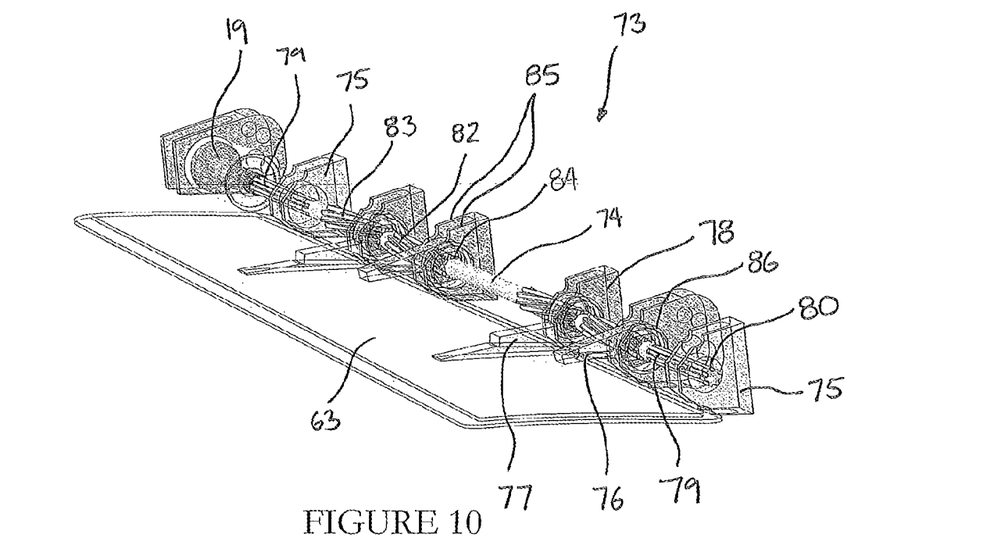
FIG. 10 is a perspective view of the hinge assembly shown in FIG. 8 with a lower spoileron mounted thereto.
Figure 11:
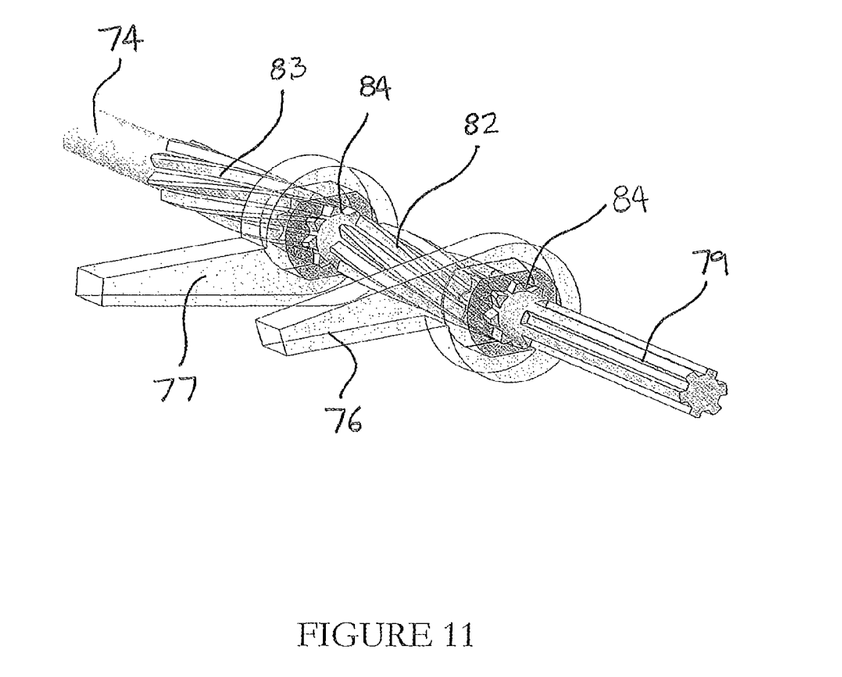
FIG. 11 is a perspective view of part of the alternative arrangement of a hinge assembly shown in FIG. 8.

Referring now to FIGS. 10 and 11, the hinge assembly 73 according to the present embodiment is shown in detail, with the lower spoileron 63 shown mounted thereto and the upper spoileron 62 omitted.

The hinge assembly 73 comprise an elongate actuating shaft 74 having a longitudinal axis extending therethrough about which the upper and lower spoilerons 62, 63 rotate. Support members 75 mount the shaft 74 to the aileron body 61, upper and lower hinge members 76, 77 mount the shaft 74 to the upper and lower spoilerons 72, 73 respectively, guide members 78 restrain the hinge members 76, 77 from moving longitudinally along the axis of the actuating shaft 74 and a linear actuator 19 urges the actuating shaft 74 to slide in a longitudinal direction along its axis.

The elongate actuating shaft 74 is cylindrical and has spline sections 79 at each end comprising linear teeth extending parallel to the axis of the shaft 74. The length of each spline section 79 corresponds to a length greater or equal to the stroke of the linear actuator 19, as will become apparent hereinafter.

The support members 75 are formed from or are fixedly mounted in the aileron body 61. Each support member 75 has a support aperture 80 formed therethrough through which a corresponding spline section 79 of the actuating shaft 74 is received. Each support aperture 80 has restraining grooves which engage with the teeth of the spline section 79 to prevent rotation of the shaft 74 and support members 75 relative to each other, but to allow the shaft to slide along its axis.

Although the spline sections 79 are shown at each end of the shaft 74, it will be appreciated that in an alternative embodiment the spline sections 79 may be spaced from the end of the shaft and that the number of support members and corresponding spline sections may be varied.

The actuating shaft 74 also has first and second drive sections 82, 83 spaced along it. Referring to FIG. 11, each drive section 82, 83 is provided with a helical gear profile extending along a portion of the shaft 74. The length of each drive section 82, 83 along the shaft 9 corresponds to a length greater or equal to the stroke of the linear actuator 19, as will become apparent hereinafter. The drive sections 25 protrude from the outer surface of the shaft 74. As shown in FIG. 10, the shaft 74 has a plurality of first drive sections 82 and a plurality of second drive sections 83.

The first and second drive sections 82, 83 have opposing helical gear profiles, for example, each first drive section 82 has a clockwise helical thread and each second drive section has an anti-clockwise helical thread.

The upper hinge members 76 fixedly mount to the upper spoileron 62. Each upper hinge member 76 is an arm with a drive aperture 84 formed therethrough, through which a corresponding first drive section 82 of the actuating shaft 74 is received. Similarly, the lower hinge members 77 fixedly mount to the lower spoileron 63. Each lower hinge member 77 is an arm with a drive aperture 84 formed therethrough, through which a corresponding second drive section 83 of the actuating shaft 74 is received. Each drive aperture 84 has an internal gear surface formed on its internal circumference such that the internal gear teeth of the drive apertures 84 engage with the teeth of the corresponding first or second drive sections 82, and the drive sections 82 are slidable in the corresponding drive apertures 84 of the hinge members 76, 77, to urge the hinge members to rotate.

The linear actuator 19 is fixedly mounted to the aileron body 61, such that the linear actuator 19 and the support members 75 are prevented from rotating relative to each other. The actuating shaft 74 is fixedly coupled to the linear actuator 19, which is a hydraulic piston or the like, such that the linear actuator 19 is able to urge the actuating shaft in a linear motion along a longitudinal axis of the actuating shaft and thereby drive the hinge members to rotate about said axis.

The guide members 78 formed from or are fixedly mounted in the aileron body 61. The guide members 78 have two arms 85 spaced from each other. A hole 86 is formed through each arm 85 through which the actuating shaft 74 is extendable, spaced from the edge of each hole 32. A hinge member 76, 77 is disposed between the arms 85 of each guide member 78 so that the hinge member is rotatable about the shaft 74, but is restrained from moving along the longitudinal axis of the shaft.

The centre of each support aperture 80 and drive aperture 84 align along a common longitudinal axis, which defines the hinge line of the spoilerons 62,63 and corresponds with the longitudinal axis of the shaft 74.

The support members 75 align with and engage their respective spline sections 79. Similarly, the upper hinge members 76 align with and engage the first drive sections 82 such that their helical gear profiles engage with the corresponding helical internal gear surface of the drive apertures 84, and the lower hinge members 77 align with and engage the second drive sections 83 such that their helical gear profiles engage with the corresponding helical internal gear surface of the drive apertures 84.

The aileron body 61 is rotatably mounted to a wing (not shown) by a conventional hinge assembly.

Operation of the hinge mechanism 73 according to the present exemplary embodiment will now be described with reference to FIGS. 10 and 11.

The aileron 60 is rotated into its desired orientation with respect to the wing by known means. The upper and lower spoilerons 62, 63 are initially in a retracted position whereby they are received in the upper and lower spoileron receiving recesses 66, 67 respectively. The spoilerons are retained in a retracted position by the linear actuator 19 resisting movement of the shaft 9. Therefore, the support members 75 are disposed at the one end of their respective splines 79 and each hinge member 76,77 is disposed at one end of their respective drive sections 82, 83.

The support members 75 and linear actuator 19 are fixedly mounted to the main aileron body 81, and so the shaft 74 is prevented from rotating by the teeth of the spline sections 79 engaging with the restraining grooves of the support member support apertures 80. The upper and lower hinge members 76, 77 are fixedly mounted to the upper and lower spoilerons 62, 63, and so the spoilerons 62, 63 are prevented from rotating into a deployed position, in which they upstand from the upper and lower faces 64, 65 of the aileron body 61 respectively, by the internal gear surface of the drive apertures 84 formed through the hinge members 76,77 engaging with the gear teeth of the corresponding first and second drive sections 82, 83 respectively, and by the hinge members 76, 77 being prevented from sliding along the gear teeth of the first and second drive sections 82, 83.

To deploy the upper and lower spoilerons 62, 63, the linear actuator 19 is actuated and urges the shaft in a direction away from the linear actuator 19. The spline sections 79 slide in the support apertures 80 of the support members 75 and prevent the shaft from rotating about its axis. The helical gear profile of each first and second drive sections 82, 83 formed on the shaft 74 acts on the internal gear surface of their corresponding upper and lower hinge members 76, 77 respectively and, because each upper and lower hinge member 76, 77 is prevented from sliding along the longitudinal axis of the shaft 74 by one of the arms 85 of the corresponding guide members 78, then the first and second drive sections urge the upper and lower hinge members 76, 77 respectively to rotate about the longitudinal axis of the shaft 74. Therefore, a moment is imparted on each upper and lower hinge member 76, 77. The upper and lower spoilerons 62, 63 then rotate in opposing directions about the longitudinal axis of the shaft 74, due to the opposing helical thread directions of the first and second drive sections 82, 83, until they are in their desired position, or are fully deployed, and then the actuation of the linear actuator 19 is stopped. The linear actuator 19 then prevents the shaft from sliding along its axis, and so the upper and lower spoilerons 62, 63 are prevented from rotating about the longitudinal axis of the shaft 74. Therefore, as the shaft 74 moves in a longitudinal direction along its axis, the upper and lower spoilerons are simultaneously deployed, and rotate simultaneously with each other.

To return the spoilerons to their retracted position, or to adjust their position, the actuating shaft 74 is urged in a direction towards the linear actuator 19. The first and second drive sections 82, 83 of the shaft 74 therefore urge the upper and lower hinge members 76,77 respectively to rotate in opposing directions towards each other, and the spoilerons 62, 63 are then rotated into their desired position.

It will be appreciated that the range of deployment of the spoilerons is determined by the stroke of the linear actuator 19 and/or the pitch of the helical gear profile of each drive section divided by the length of the drive section.

Although the hinge assembly in the present embodiment is used to pivotally mount two opposing spoilerons to an aileron, it will be appreciated that use of the hinge assembly is not limited thereto and may be used to pivotally mount different aircraft control surfaces on an aircraft.

In the above embodiments, the actuating shaft is a rigid shaft. However, it will be appreciated that control surfaces are prone to flexing and bending, for example with an aileron mounted to a wing, the aileron and associated hinge assembly will be affected by wing bending. It is envisaged that universal joints will be disposed along the shaft to deal with this problem, although it will be appreciated that other suitable means may be used.

Although a single linear actuator is used in the above embodiments, it will be appreciated that a plurality of linear actuators may be used. In particular, it is envisaged that the linear actuator described in each of the above embodiments is a first linear actuator, and that a second linear actuator is disposed at the opposing end of the actuating shaft to the first linear actuator. It is envisaged that this second linear actuator is used in conjunction with the first linear actuator, for example to urge the shaft in one direction, as a replacement actuator in the event that the first actuator fails, or as an auxiliary actuator which is provided to offer sufficient damping if the first, primary actuator fails.

It will be appreciated that the foregoing description is given by way of example only, and that modifications may be made to the support assembly of the present invention without departing from the scope of the appended claims.

The invention claimed is:

1. An aileron assembly comprising an aileron body, a first spoileron configured to extend from a first surface of the aileron body, a second spoileron configured to extend from a second surface of the aileron body, and a hinge assembly configured to move the first and second spoilerons between a retracted position, in which the first and second spoilerons are disposed in the aileron body, and a deployed position, in which the first and second spoilerons extend from the aileron body, the hinge assembly comprising a support member on the aileron body, a first hinge member on the first spoileron, a second hinge member on the second spoileron and an actuating shaft slidably mounted to the support member and configured to slide along a longitudinal axis of the actuating shaft relative to the support member, wherein the first hinge member is engaged with the actuating shaft so that the first hinge member is urged to rotate about the actuating shaft in one direction when the actuating shaft is urged to slide along the longitudinal axis, and the second hinge member is engaged with the actuating shaft so that the second hinge member is urged to rotate about the actuating shaft in an opposing direction to the first hinge member when the actuating shaft is urged to slide along the longitudinal axis such that the first and second spoilerons are urged to rotate in opposing directions about said longitudinal axis.

2. An aileron assembly according to claim 1, wherein the hinge assembly is configured to simultaneously move the first and second spoilerons between a retracted position and a deployed position.

3. An aileron assembly according to claim 1, wherein the actuating shaft comprises first and second drive sections having opposing helical gear profiles formed along the actuating shaft which engage with the first and second hinge members respectively such that, when the actuating shaft is urged along the longitudinal axis, the helical gear profile of the first drive section acts on the first hinge member to urge the first hinge member to rotate about the actuating shaft in one direction, and the helical gear profile of the second drive section acts on the second hinge member to urge the second hinge member to rotate about the actuating shaft in an opposing direction.

4. An aileron assembly according to claim 3, wherein the first and second hinge members each further comprise an aperture formed through the first and second hinge members which is configured to receive the corresponding helical drive profile, wherein each aperture has a helical gear surface which engages with and acts against the corresponding helical gear profile.

5. An aileron assembly according to claim 1, further comprising a plurality of hinge members.

6. An aileron assembly according to claim 1, wherein the actuating shaft and support member are slidably engaged to prevent the actuating shaft from rotating relative to the support about the longitudinal axis.

7. An aileron assembly according to claim 6, wherein the actuating shaft further comprises a spline section configured to slide in and engage with the support member so that the actuating shaft is prevented from rotating relative to the support about the longitudinal axis.

8. An aileron assembly according to claim 7, wherein the spline section comprises linear teeth which extend parallel to the longitudinal axis of the actuating shaft.

9. An aileron assembly according to claim 7, wherein the support member further comprises an aperture formed through the support member with grooves conforming to the spline section in which the spline section is slidably received.

10. An aileron assembly according to claim 1, further comprising a plurality of support members.

11. An aileron assembly according to claim 1, further comprising a guide means which is configured to prevent the hinge member from sliding in a direction along the longitudinal axis of the actuating shaft when the actuating shaft is urged along said longitudinal axis.

12. An aileron assembly according to claim 11, wherein the guide means has a first guide member against which the first hinge member abuts, and a second guide member against which the second hinge member abuts, when the actuating shaft is urged along the longitudinal axis.

13. An aileron assembly according to claim 12, wherein the first and second guide members comprise two guide arms which extend either side of the corresponding hinge member.

14. An aileron assembly according claim 1, further comprising a linear actuator to urge the actuating shaft along the longitudinal axis.

15. An aileron assembly according to claim 14, wherein the linear actuator is configured to urge the actuating shaft along the longitudinal axis in opposing directions.

16. An aileron assembly according to claim 15, wherein the linear actuator is mountable to the aileron body.

17. A wing assembly comprising an aileron assembly according to claim 1.

18. A wing assembly according to claim 17, further comprising a wing section, and a hinge assembly for rotatably mounting the aileron assembly to the wing section, the hinge assembly comprising a support member on one of the wing section or aileron assembly, a hinge member on the other of the wing section or aileron assembly, and an actuating shaft slidably mounted to the support member and configured to slide along a longitudinal axis of the actuating shaft relative to the support member, wherein the hinge member is engaged with the actuating shaft so that the actuating shaft and the hinge member are urged to rotate relative to each other when the actuating shaft is urged to slide along the longitudinal axis, such that the aileron assembly is urged to rotate relative to the wing section about said longitudinal axis.

* * * * *